No. 885,553. PATENTED APR. 21, 1908.
M. L. G. WHEELER.
WATER MOTOR.
APPLICATION FILED NOV. 21, 1904.
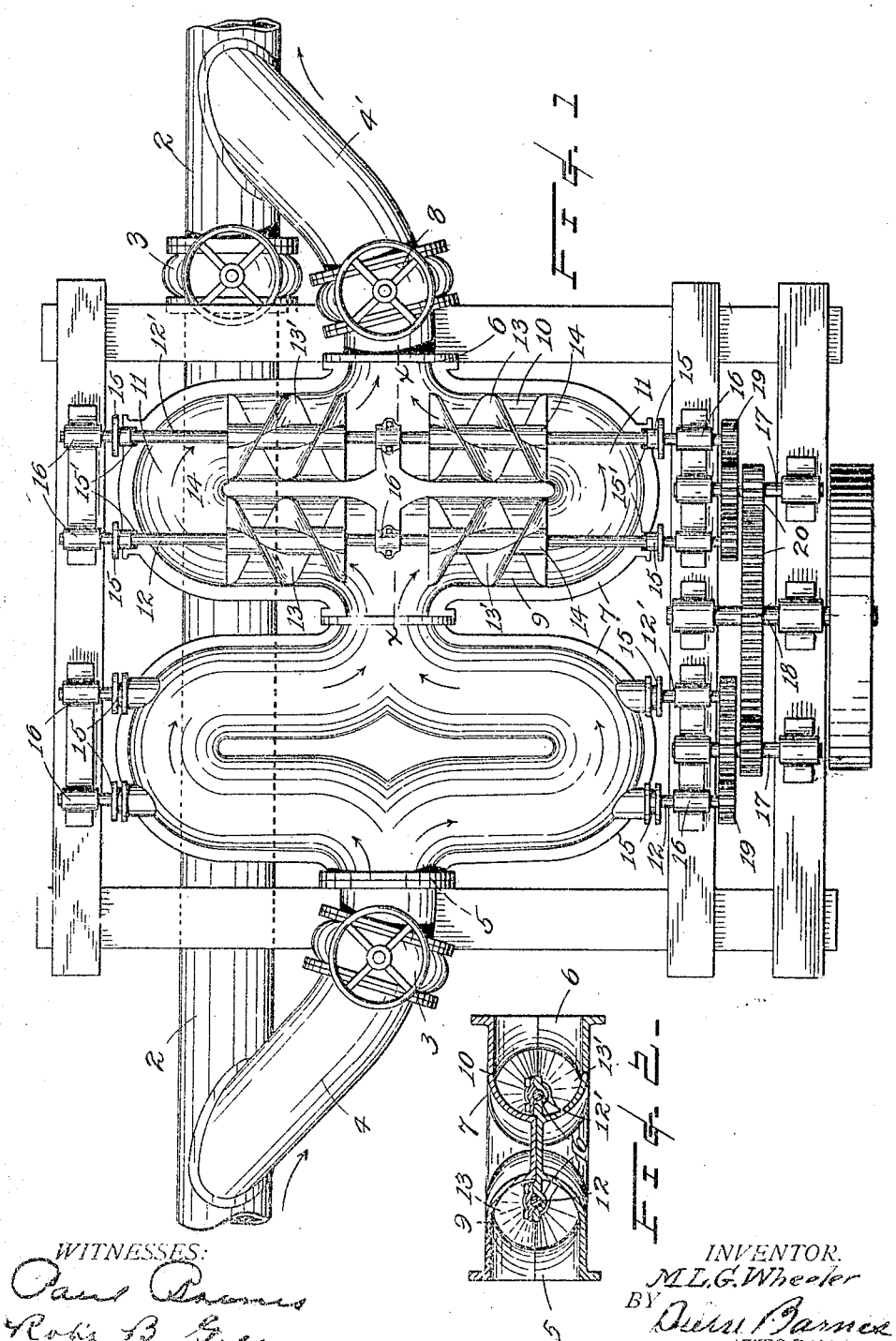
WITNESSES:
INVENTOR.
M.L.G. Wheeler
BY
ATTORNE

UNITED STATES PATENT OFFICE.

MILO L. G. WHEELER, OF SEATTLE, WASHINGTON.

WATER-MOTOR.

No. 885,553.  Specification of Letters Patent.  Patented April 21, 1908.

Application filed November 21, 1904. Serial No. 233,564.

*To all whom it may concern:*

Be it known that I, MILO L. G. WHEELER, citizen of the United States, residing at Seattle, in the county of King and State of Washington, have invented certain new and useful Improvements in Water-Motors, of which the following is a specification, reference being had therein to the accompanying drawing.

The main object of this invention is to make mechanically available the inherent motive power of a body of water flowing through a main or conducting pipe, an object which I attain by the mechanism which I will now proceed to describe, reference being had to the accompanying drawing, in which—

Figure 1 is a plan of a portion of a water main with two of my improved motors connected thereto, with the cover of one being removed to display the power devices therein; and Fig. 2 is a cross section taken on line x—x of Fig. 1.

The numeral 2 represents a pipe line or water main having a gate or like valve 3 and openings upon each side of the latter which are connected by branch pipes 4 and 4' with the inlet and outlet openings 5 and 6, respectively, of the motor casing or casings 7 and forming therewith a by-pass wherethrough the water is conveyed back to the main. Valves 8 are included in these branch pipes for the purpose of shutting off the water from the motors.

In the drawings I show two motors connected together but it should be understood that one or more can be used according to the power required and the force of the water.

The motor-casings are each provided with two parallel transversely arranged chambers 9 and 10 which are connected at their ends to each other by reverse channels 11 and intermediately of their lengths to said casing openings. These channels and chambers are circular in cross section and extending axially through the latter are power-shafts 12 and 12' severally carrying a right-hand screw 13 and a left-hand screw 13'. The spiral blades of these screws are formed integral with hubs 14 which are keyed or otherwise rigidly secured to their respective shafts.

For convenience in manufacturing and assembling the parts of the motor, the casings are each divided into two parts on a horizontal plane passing through the shafts' axes and are secured together by bolts, not shown. 15 are glands which project into semi-cylindrical depressions 15' of the casing to form stuffing boxes to prevent the leakage of the water where the said shafts extend through the casing. Journal boxes 16 are provided for the shafts and the power can be taken by suitable means, such as pulleys, directly from the latter or from supplemental shafts 17 and 18 which are actuated by trains of gears 19 and 20, as is usual in transmitting power.

The operation of the invention is as follows: When the valve in the main is closed and those in the branch pipes opened, the water will be diverted to pass through the motors. Upon entering the first motor, where more than one is used as in the illustration, the stream is bifurcated and each half is caused to flow in opposite directions thence back to the casing outlet where it is united in a single body, to be again divided and returned to the same condition in each motor used. The divided streams of water act against the right and left-handed spiral blades of each shaft and rotate the same with the end pressures balanced thereby requiring no collars or thrust boxes to prevent endwise motion.

It may be said that the several power shafts may just as well be used individually for transmitting power, for oftentimes it is advantageous to do so rather than to transmit the accumulated force integrally.

Having described my invention, what I claim as new and desire to secure by Letters-Patent, is—

In a device of the class described, the combination with a water main of an elongated casing having inlet and discharge passages at its opposite sides and divided centrally by a longitudinal partition spaced at the ends from the casing and with bearings extending laterally therefrom, conduits leading at two points from said main and connected respectively to the discharge and intake passages of said casing regulating valves positioned in each of said conduits, shafts spaced apart and journaled through said casing at opposite sides of said partition and supported in said bearings, each shaft carrying an integral right hand screw and an integral left hand screw at opposite sides of said partition and operating in said casing, and a supporting framework surrounding said casing, the ends of said shafts journaled in said framework and a driven shaft carried thereby, gearing connecting one end of each of the aforementioned shafts to said driven shaft for transmitting the motion of said shafts simultaneously and the oppositely arranged screws carried by the separate shafts arranged within a continuous water passage, as fully described.

In testimony whereof I affix my signature in presence of two witnesses.

MILO L. G. WHEELER.

Witnesses:
PIERRE BARNES,
PAUL BARNES.